1/24/84 XR 4,426,843

United States Patent [19]

Fowler et al.

[11] 4,426,843

[45] Jan. 24, 1984

[54] $CO_2$ COUPLING MATERIAL

[75] Inventors: Michael C. Fowler, Farmington; David C. Smith, Glastonbury, both of Conn.

[73] Assignee: United Technologies Corporation, Hartford, Conn.

[21] Appl. No.: 206,206

[22] Filed: Nov. 12, 1980

[51] Int. Cl.[3] .......... F02K 9/95

[52] U.S. Cl. .......... 60/203.1; 60/204; 219/121 L

[58] Field of Search .......... 60/203, 204; 372/76, 372/90; 219/121 L, 121 LM

[56] References Cited

U.S. PATENT DOCUMENTS

| | | | |
|---|---|---|---|
| 3,495,406 | 2/1970 | Donatelli et al. | 60/227 |
| 3,818,700 | 6/1974 | Kantrowitz et al. | 60/203.1 |
| 3,825,211 | 7/1974 | Minovitch | 60/203.1 |
| 4,036,012 | 7/1977 | Monsler | 60/203.1 |

*Primary Examiner*—Carlton R. Croyle
*Assistant Examiner*—Jeffrey A. Simenauer
*Attorney, Agent, or Firm*—Eric W. Petraske

[57] ABSTRACT

An improved energy conversion device for converting the energy carried by a laser beam to kinetic energy of a working fluid transparent to the laser radiation incorporates a seed gas having a relatively low dissociation temperature. The beam is focused to a beam spot the maximum diameter of which depends on the total power of the beam.

3 Claims, 5 Drawing Figures

MEASURED a VS TEMPERATURE (T)
$H_2O$ (0.3 atm) IN $H_2$ (13 atm)

MEASURED a VS TEMPERATURE (T)

$D_2O$ (0.3 atm) IN $H_2$ (13 atm) $D_2O$ (0.10 atm) IN $H_2$ (114 atm)

FIG. 3
MEASURED a VS TEMPERATURE (T)
$NH_3$ (0.086 atm) IN (5.7 atm) $H_2$
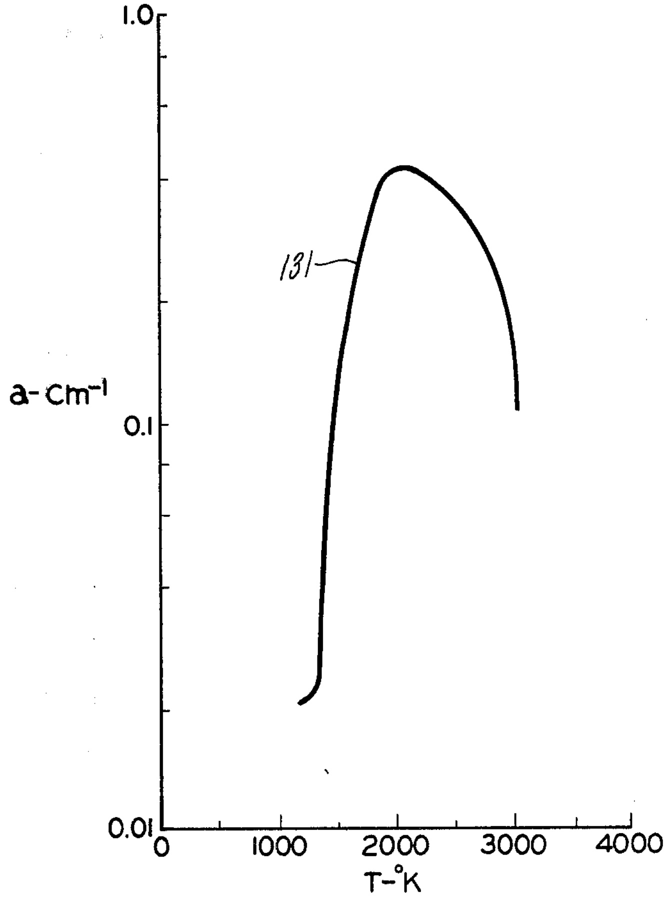
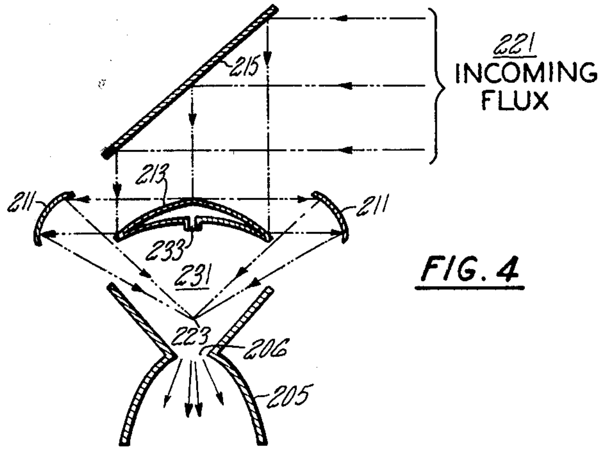
FIG. 4

ABSORPTION PER Cm FOR 1 atm $NH_3$ IN 10 atm $H_2$ VS TEMPERATURE (T)

W= 945.94 $cm^{-1}$

$CO_2$ COUPLING MATERIAL

The Government has rights in this invention pursuant to Contract No. F04611-77-C-0039 awarded by the Air Force

DESCRIPTION

Technical Field

The invention relates to an improved energy conversion device for converting the energy carried by a laser beam to kinetic energy.

Background Art

The use of high power lasers to supply energy to rockets has previously been suggested. Typically, a working fluid is heated by the laser beam and the heated fluid exits through a nozzle, supplying thrust to the rocket. One working fluid that has been suggested is hydrogen, because of its low mass, but since hydrogen is transparent to $CO_2$ radiation, it is necessary to incorporate a material that absorbs $CO_2$ radiation, one such material being deuterium (U.S. Pat. No. 4,036,012). It has previously been thought by those skilled in the art that an essential requirement for a molecular radiation coupling medium was that it not dissociate at the elevated temperatures present in that portion of the working fluid illuminated by the laser beam. One paper has reported theoretical calculations suggesting that $H_2O$ will resist dissociation to temperatures in excess of 4,500° K., (Laser Propulsion, Selph and Wenning, paper 76-166, International Astronautical Congress, Anaheim CA., Oct. 10–16, 1976) but it was thought by those skilled in the art that the low absorptivity of $H_2O$ would be a substantial drawback.

Disclosure of Invention

The invention relates to the use, as a radiation coupling material for coupling energy from a laser beam to a working fluid, of molecular compounds that strongly absorb radiation of wavelength approximately ten microns and have low molecular weight but tend to dissociate at temperatures present in the laser beam from which radiation is coupled. Particular materials include $H_2O$, $D_2O$, HDO and $NH_3$.

BRIEF DESCRIPTION OF THE DRAWINGS

FIG. 3 shows the same parameters for $NH_3$; and

FIG. 4 shows a heating chamber incorporating the invention.

BEST MODE FOR CARRYING OUT THE INVENTION

An optical beam passing through an absorbing medium loses energy according to the formula:

$$E_{absorbed} = E_{incident}\,(l - e^{-al}) \quad (1)$$

where l is the length through the medium and a=ku where k is the absorption per molecule and u is the molecular concentration. The parameter a is a function of temperature and is expected to have the dependence shown by line 111 in FIG. 1, which represents the calculated dependence of a for a mixture of $H_2$ and $H_2O$ in the ratio of 10:1. The falloff above 3,000° K. is caused in large part by the expected dissociation of $H_2O$ at elevated temperatures.

Figure 1:
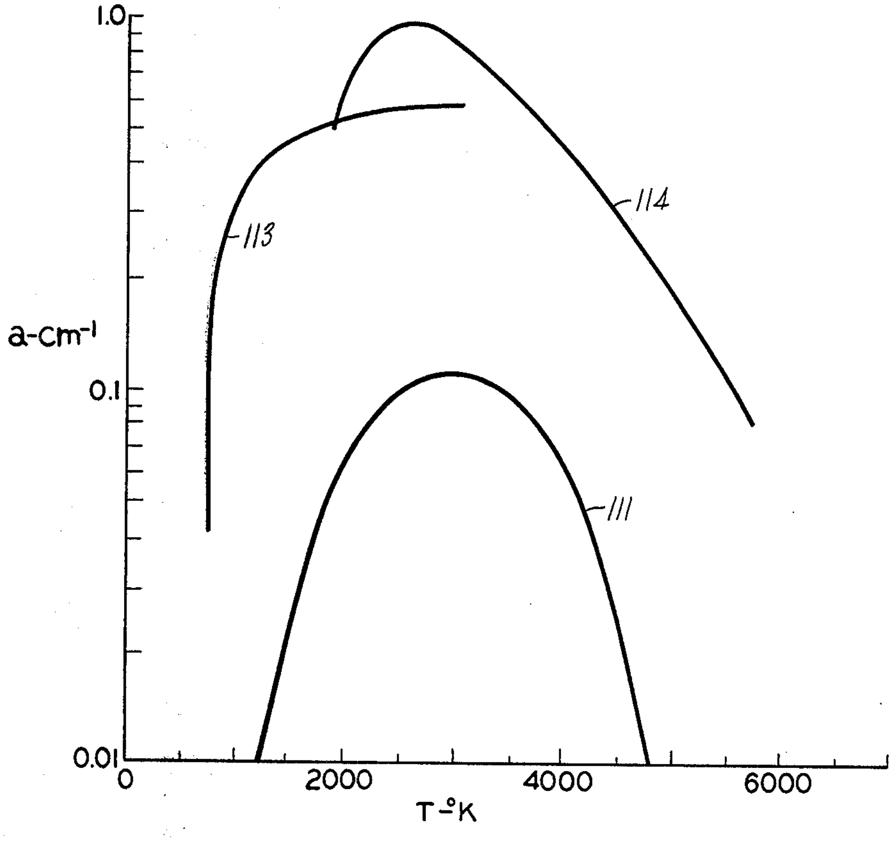
FIG. 1 shows calculated and measured values of the product of the physical parameters relevant to energy absorbed from the beam using $H_2O$ as a coupling material.
Figure 2:
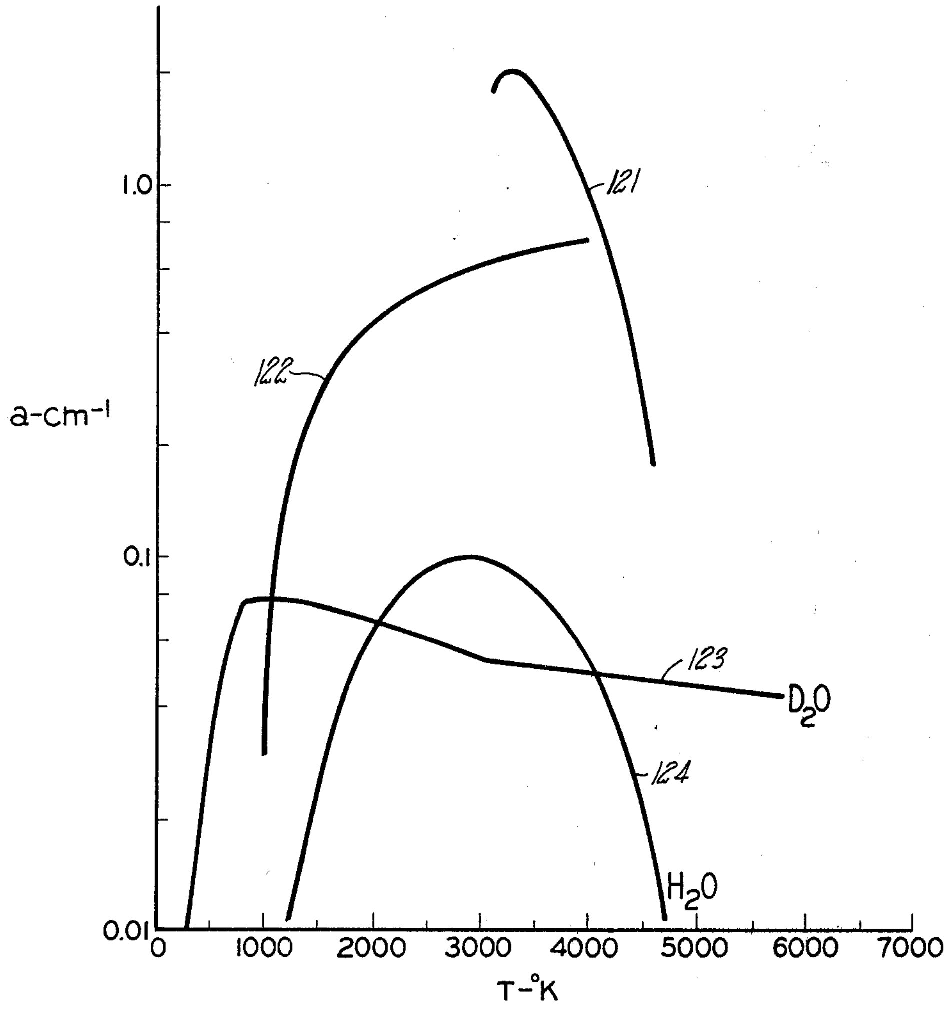
FIG. 2 shows the same parameters for $D_2O$.
Figure 5:
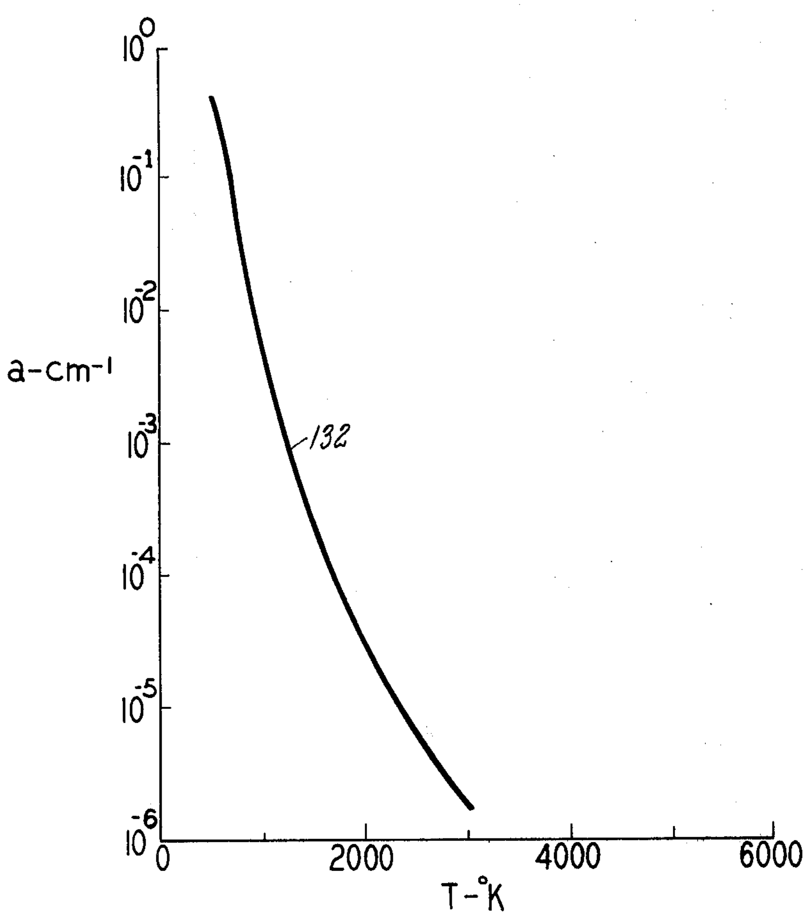
FIG. 5 shows a calculated curve relevant to the measured values of FIG. 3.

It has been discovered unexpectedly that the measured values for a are about a factor of 10 greater than the theoretical values. In FIG. 1, curves 113 and 114 represent data taken by probing a high-temperature region near a 0.1 mm diameter focal spot of a kw power level cw $CO_2$ laser. Curve 114 was plotted from data taken when the beam sustained an independently produced plasma in the working fluid as a heat source, and curve 113 derives from data taken in the absence of a plasma, when the beam-medium interaction was great enough to heat the medium to the temperature indicated. The fluid tested comprised a mixture of 13 atmospheres of $H_2$ and 0.3 atmospheres of $H_2O$. In FIG. 2, similar results are shown for $D_2O$, with curve 121 being measured data with a plasma for 0.3 atmospheres of $D_2O$ in 13 atmospheres of $H_2$ and curve 122 being measured data without a plasma for 0.1 atmospheres of $D_2O$ in 11.4 atmospheres of $H_2$ and curves 123 and 124 being theoretically calculated curves for 10:1 mixtures of $D_2O$ and $H_2O$ to $H_2$, respectively. Similarly, curve 131 in FIG. 3 shows non-plasma data for $NH_3$ for 0.09 atmospheres of $NH_3$ in 5.7 atmospheres of $H_2$. Curve 132 in FIG. 5 shows the calculated temperature dependence for a different $CO_2$ line ($w=945.94\ cm^{-1}$ instead of 950 $cm^{-1}$) for a 10:1 $H_2$ to $NH_3$ mixture. The difference between the theoretical curve and the measured results is especially striking in this case, as the measured values rise by a factor of three while the theoretical curve falls by four orders of magnitude.

The cause of these unexpectedly favorable measurements is not known. A possible explanation for the large absorption is a highly nonequilibrium energy level population distribution in the absorbing material, a situation not considered in the calculations. The unexpectedly high thermal stability seen in the case of $NH_3$ may be due to the diffusion of replacement coupling material into the beam spot from the remainder of the working fluid.

In equation (1), the absorbed energy depends on the length l and the coefficient a, which in turn depends on the intensity in the beam spot. It has been shown experimentally that an intense beam will heat the working fluid to a point where the system will "bootstrap" itself up the curve in FIG. 1, i.e., a temperature above 1,000° K. in the case of $H_2O$ will raise a, which, in turn, implies that more power will be absorbed, raising the temperature which, in turn, raises a, until the peak of the curve is reached. This effect permits the deposition of substantial amounts of power in a small, sharply focused beam spot. The minimum intensity required to produce bootstrapping may be referred to as the bootstrapping intensity threshold and will be a characteristic of the working fluid in a given apparatus.

An implication of the foregoing consideration is that, for a given total beam power, there is a maximum beam spot size that will pass the threshold for bootstrapping. Increasing the degree of focus decreases both a and l so that, to a first approximation, a beam spot of zero radius will deliver zero power, and there will be some optimum beam spot size (for a given total power) for which the product al and hence the absorbed power is an optimum. If the power is increased while the spot size is held constant, a will increase then decline as shown in FIGS. 1-3 and the product al will reach an optimum value determined by the point for which increased l (i.e., the length over which the intensity passes the bootstrapping threshold) balances decreased a, and the absorbed energy (as a function of input power) will reach a maximum value and then either level off or decline, depending on the parameters of the particular system. If it is desired to transfer more energy to a working fluid than this limiting amount, then the power and the beam spot size may both be increased or the beam may be split into several sub-beams. It is expected that the maximum permissible beam radius for bootstrapping will scale linearly with input beam power, so that higher power beams will require less sharp focusing.

Applications of the working fluid include laser powered rockets such as those disclosed in U.S. Pat. Nos. 4,036,012; 3,818,700 and 3,825,211. These patents disclose complete systems including a ground-based laser and beam handling equipment to direct the laser beam to a rocket and focus it in a working fluid, which equipment forms no part of the invention that is the subject of this patent application. An additional use is illustrated in U.S. Pat. No. 3,495,406, which discloses the use of a laser to heat a working fluid which powers rotary motion of a shaft.

One convenient embodiment of a focusing system that may be used in conjunction with the subject inventive working fluid is illustrated in FIG. 5 of Pat. No. 4,036,012, incorporated in the specification as FIG. 4. In this illustration, a laser beam 221 is deflected by plane mirror 215 onto convex mirror 213, then to concave mirror 211, then to beam spot 223. Both mirrors 211 and 213 are circularly symmetric, so that the beam is spread azimuthally over 360°, except for mounting supports not shown. If it is desired to have more than one beam spot in order to facilitate uniform heating of fluid 231, mirror 211 may be segmented into submirrors having different radius of curvature and/or tilt. Fluid 231, called herein a kinetic fluid illustratively comprising a working fluid of hydrogen and a water vapor absorbing material, is a mixture of 0.3 atmospheres of $H_2O$ in 13 atmospheres of $H_2$. Fluid 231 is injected into heating chamber 205 through pipe 233, the supply tanks, mixing chamber and the like being omitted from the illustration for simplicity. The heated kinetic fluid then escapes chamber 205 through a conventional rocket nozzle 206.

Although the invention has been shown and described with respect to a preferred embodiment, it will be understood by those skilled in this art that various changes in form and detail thereof may be made without departing from the spirit and scope of the claimed invention.

We claim:

1. A method for converting electromagnetic radiation energy from a $CO_2$ laser to kinetic energy of a kinetic fluid comprising the steps of:

mixing a low atomic weight working fluid that is substantially transparent to $CO_2$ radiation with a predetermined portion of a radiation conversion material having triatomic molecules with atomic weights of less than 20 to form a kinetic fluid;

passing said kinetic fluid into a heating chamber;

generating at least one beam of $CO_2$ optical radiation and having at least one power level;

transporting said at least one beam of optical radiation to said heating chamber;

focusing said at least one beam of optical radiation to at least one predetermined focus area within said heating chamber;

absorbing electromagnetic energy from said at least one beam in said focus area by interaction with said radiation conversion material; and transferring kinetic energy from said radiation conversion material to said working fluid, said at least one focus area being related to said at least one power level so that a portion of said kinetic fluid within said focus area is raised to a nonequilibrium state having a highest temperature between about 1,000° K. and about 5,000° K.

2. A method according to claim 1, in which said kinetic fluid expands outwardly from said heating chamber through a rocket nozzle, thereby imparting thrust to said heating chamber.

3. A method according to claim 2, in which said working fluid is substantially composed of hydrogen and said radiation conversion material is formed from a compound of hyrdrogen and oxygen.

* * * * *